3,522,103
PROCESS FOR THE DENSIFICATION OF MIXED NICKEL OXIDE AND STABILIZED ZIRCONIA
Donald W. White, Burnt Hills, N.Y., and Philippe D. S. St. Pierre, Birmingham, Mich., assignors to General Electric Company, a corporation of New York
Filed July 28, 1967, Ser. No. 656,812
Int. Cl. H01m 27/16; C04b 41/00; F16h 13/02
U.S. Cl. 136—120                                              8 Claims

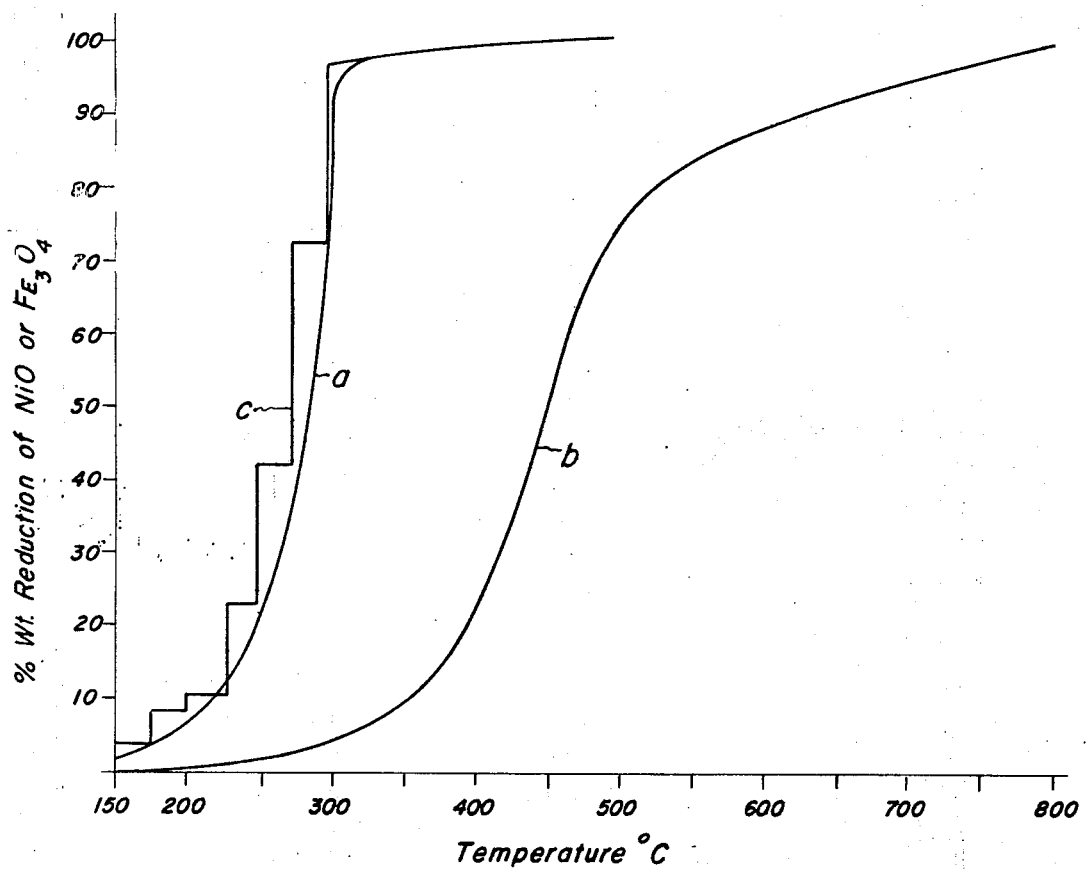

ABSTRACT OF THE DISCLOSURE

The formation of a spurious nickel composition during the sintering of a layer of mixed nickel oxide and stabilized zirconia deposited over a stabilized zirconia body containing about 2% $Fe_3O_4$ is avoided by: (a) heating the layer and substrate in hydrogen at a temperature in the range of from about 250° C. to about 375° C. to cause the NiO to be completely reduced; (b) substituting a neutral atmosphere or an atmosphere that acts to oxidize iron but to retain the nickel so produced in the metallic state, and then (c) raising the temperature to about 1400° C. to complete the sintering operation.

BACKGROUND OF THE INVENTION

This improvement has particular applicability in the manufacture of components for fuel cells operable at high temperatures (in the range of 1000° C. to 1200° C.) such as are shown in U.S. Letters Patents 3,138,487 and 3,138,490 assigned to the assignee of the instant application. Such fuel cells employ a solid oxide-ion electrolyte, solid electrodes, fuel and oxygen supplies for the respective electrodes, and electrical leads connected to the respective electrodes.

Such fuel cells, which generate low voltage direct current power on a continuous basis, have application in various chemical process industries, such as in the manufacture of aluminum and in the electro-refining of copper. In addition, the cells can be employed to operate direct current motors.

Although the preferred oxide-ion material for the practice of this invention is solid stabilized zirconia, other solid oxide-ion materials, such as doped thoria, are satisfactory.

Solid stabilized zirconia, which is a solid oxide ion electrolyte material, is a compound with a cubic crystal structure consisting of zirconia to which is added calcium oxide, yttrium oxide, or a mixture of rare earth oxides. For example, the preferred solid zirconia material is often stabilized with 11 molecular percent calcium oxide. Other stabilized zirconias, which may also be employed in the solid stabilized zirconia electrolyte, are discussed in "Oxide Ceramics" by Ryshkewitch, Academic Press, 1960, particularly on pages 354, 364 and 376 thereof.

Solid doped thoria is also a solid oxide-ion electrolyte material which consists of thoria to which is added calcium oxide, yttrium oxide, or a mixture of rare earth oxides. For example, a solid doped thoria material consists of thoria which is doped with the addition of four molecular percent calcium oxide to increase its conductivity.

Lithiated nickel oxide is an electronic semiconductor which is a very satisfactory cathode material, when applied as a porous layer adhering to one surface of the solid oxide-ion body functioning as the electrolyte of the cell. Other cathode material such as silver and doped tantalum pentoxide are also suitable. Anodes containing metals such as nickel, cobalt or copper, for example, are suitable. Fuels such as hydrogen and carbon monoxide may be used in the fuel cell.

One of the difficulties faced in the use of solid oxide-ion electrolytes is the problem of the passage of gas through the electrolyte material. By minimizing such gas penetration, the operating efficiency of the cell can be increased. One solution to this problem of gas leakage through the solid oxide-ion electrolyte is disclosed in application Ser. No. 412,158, Mitoff, filed Nov. 18, 1964, now Pat. No. 3,404,039 and assigned to the assignee of this invention. As is set forth therein it has been discovered that by adding from 0.5 to 10.5 weight percent of iron oxide to the solid oxide-ion material gas passage therethrough is minimized and an essentially ionic conductor is provided.

In one fuel cell component construction a layer of a porous mechanical mixture of nickel oxide particles and stabilized zirconia particles is prepared by depositing these materials simultaneously on a substrate by slurry coating, paint spraying, plasma spraying or other suitable means and subsequently a body of stabilized zirconia is deposited thereon by plasma spraying. This composite is then heat treated both for the purpose of reducing the NiO to nickel metal to produce a porous Ni-$ZrO_2$ cermet layer able to function electrically as an anode and for the purpose of densifying the zirconia electrolyte body. The sintering temperature must be kept below the melting point of nickel (1452° C.), of course, and in order to promote sintering below this temperature, which sintering renders the stabilized zirconia layer impervious, a small amount (approximately 2%) of $Fe_3O_4$ is added to the stabilized zirconia. A gaseous atmosphere (13 parts $CO_2$ and 1 part CO) oxidizing to iron, but reducing to nickel, has been employed in the past in order to effect simultaneous reduction of the nickel oxide and densification of the zirconia layer. However, it was found that this treatment has caused serious crack formation in the composite piece. In the search for a solution for this problem it was deduced that the reducing action was not severe enough to convert all of the NiO to Ni and yet the paradox is that the use of a more highly reducing atmosphere would be expected to cause reduction of the iron oxide, a most undesirable circumstance, because the amount of densification of the zirconia obtainable would then be diminished.

SUMMARY OF THE INVENTION

It has been found unexpectedly that a temperature range exists within which in a highly reducing atmosphere, such as a hydrogen environment, a ceramic body containing both nickel oxide and iron oxide may be heat treated to reduce the nickel oxide before it can inter-act with the iron oxide to any significant extent to form any spurious nickel composition, such as nickel ferrite, having an undesirably high coefficient of expansion, the presence of which would result in cracking of the ceramic body. Once the complete reduction of the nickel oxide to nickel metal has been accomplished (by continuous heating or step-heating), the remainder of the heat treatment can be conducted at much higher temperatures in a neutral or midly reducing atmosphere, such as in the $CO_2$-CO atmosphere mentioned hereinabove, to prevent re-oxidation of the nickel without developing cracks in the ceramic body. If desired a neutral environment may be employed after reduction of the NiO during the increase in temperature to the sintering temperature after which the midly reducing atmosphere can be introduced.

The term "ceramic composite" is intended to describe a ceramic material in combination with iron oxide and nickel oxide with the iron oxide present as discrete particles interpersed with or in solution in the ceramic phase and with the nickel oxide as discrete particles in the ceramic phase.

DESCRIPTION OF THE PREFERRED EMBODIMENT

The preferred treatment of an inert ceramic body containing a nickel oxide-iron oxide mixture (or having an interface between a ceramic layer containing nickel oxide and a ceramic layer containing iron oxide), which body is to be subjected to sintering temperatures in excess of about 600° C., is to preheat the ceramic body in a highly reducing atmosphere at temperatures in the range of from about 250° C. to about 375° C. sufficiently long to reduce the nickel oxide to nickel metal. By retaining the temperature in the aforementioned range the nickel oxide is reduced, but the iron oxide is not reduced in any significant amount and remains available as the oxide to promote sintering and densification of the ceramic body.

The period of heating will depend upon the size of the ceramic body being treated, but the temperature-time relationship will preferably be in the range of from about 250° C. for a period of about 24 hours to about 375° C. for a period of about one hour.

Thus, in the case of a combined anode-electrolyte being fabricated for a high temperature fuel cell wherein a layer of yttria-stabilized zirconia containing about 2% $Fe_3O_4$ has been deposited over the surface of a layer of lime-stabilized zirconia containing about 60% by weight, or more, nickel oxide, satisfactory reduction of the nickel oxide to nickel is accomplished by heating the ceramic composite in a hydrogen atmosphere (the hydrogen gas need not have been dried) at about 300° C. for about 3 hours. Thereafter, the heat treatment is continued in a neutral or mildly reducing gaseous atmosphere, as for example $CO_2$-CO, at about 1400° C. to effect the requisite sintering without encountering the problem of cracking of the composite upon cooling.

Experimental verification for this phenomenon is shown in the accompanying drawing. The several curves represent weight loss upon heating in hydrogen as a function of temperature of separate samples of ceramic containing either $Fe_3O_4$ or NiO. The weight loss of $Fe_3O_4$ or NiO from these samples as a function of temperature was measured by means of a thermobalance. Curve $a$ actually presents the results obtained by heating a sample of 60% by weight of NiO particles mixed with lime-stabilized zirconia particles and curve $b$ indicates the results to be obtained by heating a sample of yttria-stabilized zirconia doped with about 1.6 weight percent $Fe_3O_4$. Each sample was heated steadily from room temperature in a hydrogen atmosphere continuously increasing the temperature at a rate of about 2.5° C. per minute. In each case the weight loss below 150° C. was negligible. In addition, a second sample using 60 weight percent NiO (NiO/lime-stabilized zirconia) was subjected to step-heating (curve $c$) being held at several different temperatures isothermally during the heating period.

As is manifest from an examination of the results graphically displayed, the NiO register weight loss indicating its reduction to nickel in the highly reducing atmosphere at temperatures about 125° C. below the temperatures at which significant $Fe_3O_4$ weight loss and, therefore, reduction occurs.

Although stabilized zirconia is the ceramic employed to illustrate this invention, bodies to be sintered in which other ceramic materials, iron oxide and nickel oxide are contained (the ceramic materials being inert to strongly reducing atmospheres) may be subjected to the treatment described herein. Such other ceramic materials are alumina, magnesia, yttria, thoria and other rare-earth oxides.

In place of pure, or substantially pure, hydrogen as the gaseous atmosphere potentially able to reduce both iron and nickel, mixtures of hydrogen with one or more other gases, such as nitrogen may be used. One example of a hydrogen-nitrogen environment is that obtained with cracked ammonia. When mixtures of gases containing hydrogen are supplied from an endothermic or exothermic gas generator care must be taken to adjust the composition of the gas output so as to minimize carbon formation over the reducing surface. The problem of carbon formation was seen to occur when tests were conducted to reduce the nickel oxide component using either (a) methane and (b) pure carbon monoxide in place of the hydrogen gas. Excessive carbon deposition on the test sample destroyed the structure integrity thereof.

What we claim as new and desire to secure by Letters Patent of the United States is:

1. In a process for sintering a ceramic composite body containing iron oxide and nickel oxide at temperatures in excess of about 600° C. and below about 1450° C. in a gaseous environment oxidizing to iron but reducing to nickel, the improvement comprising:
   (a) heating the ceramic composite body in the temperature range of from about 250° C. to about 375° C. for a period of at least about one hour in a first atmosphere potentially able to reduce both iron and nickel,
   (b) substituting for said first atmosphere a second atmosphere reducing to nickel but not reducing to iron, and
   (c) heating said ceramic composite body in said second atmosphere to about the sintering temperature for conduct of the sintering step.

2. The improvement in claim 1 wherein the first atmosphere is hydrogen.

3. The improvement in claim 2 wherein the ceramic composite body consists of stabilized zirconia, iron oxide and nickel oxide prior to heating in the first atmosphere.

4. The improvement in claim 2 wherein the second atmosphere is about 13 parts carbon dioxide and 1 part carbon monoxide.

5. In the sintering of a combined solid oxide-ion electrolyte/cermet anode for a high temperature fuel cell to which oxide-ion electrolyte a small amount of iron oxide has been added to promote sintering and consequent densification in the temperature range of from about 600° C. to about 1450° C. and wherein the cermet anode consists of stabilized oxide ion electrolyte particles mixed with nickel oxide particles, the improvement comprising:
   (a) heating the combined solid oxide-ion electrolyte/cermet anode in the temperature range of from about 250° C. to about 375° C. for a period of at least about one hour in a first atmosphere potentially able to reduce both nickel and iron,
   (b) substituting for said first atmosphere a second atmosphere reducing to nickel but not reducing to iron, and
   (c) heating said combined solid oxide-ion electrolyte/cermet anode in said second atmosphere to about the sintering temperature for conduct of the sintering step.

6. The improvement recited in claim 5 wherein the first atmosphere is hydrogen.

7. The improvement recited in claim 6 wherein the second atmosphere is about 13 parts carbon dioxide and 1 part carbon monoxide.

8. The improvement recited in claim 6 wherein the second atmosphere is neutral with respect to the materials being heated.

References Cited

UNITED STATES PATENTS 3,404,040 10/1968 Mitoff et al. ......... 136—86
3,416,967 12/1968 White ............... 136—86

FOREIGN PATENTS 1,283,488 12/1961 France.
  919,052 2/1963 Great Britain.

WINSTON A. DOUGLAS, Primary Examiner

M. J. ANDREWS, Assistant Examiner

U.S. Cl. X.R.

29—182.2, 182.5; 75—206, 208, 224; 136—86; 264—61, 66